(12) United States Patent
Kusens (10) Patent No.: US 10,876,820 B2
(45) Date of Patent: Dec. 29, 2020

(54) METHOD AND SYSTEM FOR UTILIZING JET ENGINES TO CLEAR DRONES FROM AIRSPACE

(71) Applicant: COLLATERAL OPPORTUNITIES, LLC, Wilmington, DE (US)

(72) Inventor: Bruce Kusens, North Miami Beach, FL (US)

(*) Notice: Subject to any disclaimer, the term of this patent is extended or adjusted under 35 U.S.C. 154(b) by 491 days.

(21) Appl. No.: 15/908,017

(22) Filed: Feb. 28, 2018

(65) Prior Publication Data
US 2018/0245889 A1    Aug. 30, 2018

Related U.S. Application Data

(60) Provisional application No. 62/464,899, filed on Feb. 28, 2017.

(51) Int. Cl.
*F41H 11/08*    (2006.01)
*F02C 9/16*    (2006.01)
(Continued)

(52) U.S. Cl.
CPC ............. *F41H 11/08* (2013.01); *F02C 6/04* (2013.01); *F02C 7/24* (2013.01); *F02C 9/16* (2013.01);
(Continued)

(58) Field of Classification Search
CPC .. F41H 11/08; F41H 11/02; F02C 6/04; F02C 7/24; F02C 9/16; G05B 15/02; G08G 5/0095; F02D 2220/32; F05D 2240/91
(Continued)

(56) References Cited

U.S. PATENT DOCUMENTS 6,542,109 B2 * 4/2003 Lloyd .................... F41H 11/02
                                                342/14
7,478,578 B2 * 1/2009 Kirkpatrick ............. F41H 11/02
                                                244/1 R
(Continued)

FOREIGN PATENT DOCUMENTS

RU          152656 U1     6/2015
RU         2572924 C2     2/2016
WO      2017/013417 A1    1/2017

OTHER PUBLICATIONS

DroneBelow.com; "Using Jet Engines to Clear Drones from Airspace" by Stefan Tasevski; Sep. 20, 2018 [all pages]; https://dronebelow.com/2018/09/20/using-jet-engines-to-clear-drones-from-airspace/ (Year: 2018).*
International Search Report and Written Opinion for corresponding PCT Application (PCT/US 2018/020235 dated Aug. 30, 2018.

*Primary Examiner* — Samir Abdosh
(74) *Attorney, Agent, or Firm* — Daniel S. Polley, P.A.

(57) ABSTRACT

A system and method that uses one or more jet engines to remove unmanned aircraft from restricted airspace. Generally, the force created by a jet engine can be used to remove drones or other unwanted objects from the restricted airspace. Once the system determines the presence of an unauthorized aircraft or object within the restricted airspace, the jet engine(s) can be activated and used to pull the drone or flying object towards the jet engine though the force created by the intake of the jet engine(s), or to expel the drone or object from the restricted area through the force created by the exhaust of the jet engine(s).

20 Claims, 4 Drawing Sheets

(51) Int. Cl.
    *F02C 7/24*         (2006.01)
    *G05B 15/02*      (2006.01)
    *G08G 5/00*       (2006.01)
    *F41H 11/02*      (2006.01)
    *F02C 6/04*        (2006.01)

(52) U.S. Cl.
    CPC ............ *F41H 11/02* (2013.01); *G05B 15/02* (2013.01); *G08G 5/0095* (2013.01); *F05D 2220/32* (2013.01); *F05D 2240/91* (2013.01)

(58) Field of Classification Search
    USPC .......................................................... 89/1.11
    See application file for complete search history.

(56) References Cited

U.S. PATENT DOCUMENTS

| | | | |
|---|---|---|---|
| 9,412,278 B1* | 8/2016 | Gong | G06F 16/29 |
| 2002/0145554 A1* | 10/2002 | Lloyd | G01S 7/537 |
| | | | 342/13 |
| 2005/0150371 A1* | 7/2005 | Rickard | F41H 11/02 |
| | | | 89/1.11 |
| 2008/0190274 A1* | 8/2008 | Kirkpatrick | F41H 11/02 |
| | | | 89/1.11 |
| 2015/0254988 A1* | 9/2015 | Wang | B64D 47/08 |
| | | | 701/3 |
| 2018/0245889 A1* | 8/2018 | Kusens | F41H 11/08 |
| 2019/0100315 A1* | 4/2019 | Theiss | B64D 7/00 |

* cited by examiner

FIGURE 1: Drone Removal

FIGURE 2: Centralized Monitoring and Alerting

FIGURE 3: Jet Engine Components

F3a      F3b      F3c      F3d      F3g

FIGURE 4: Wireless Identification of Permitted Aircraft

METHOD AND SYSTEM FOR UTILIZING JET ENGINES TO CLEAR DRONES FROM AIRSPACE

This application claims the benefit of and priority to U.S. Provisional Patent Application Ser. No. 62/464,899, filed Feb. 28, 2017, which is incorporated by reference in its entirety for all purposes.

BACKGROUND

A typical jet engine is a gas turbine, composed of a compressor, which has blades that spin rapidly. This draws in air and compresses it, which converts the air to a high-pressure gas. Fuel is then injected into the gas and ignited, increasing the gas's temperature and pressure. The gas then flows through a turbine which extracts energy from the gas, lowering the gas's temperature and pressure. The turbine forces the gas out the back of the engine through a nozzle. This action decreases pressure, but increases the gas's velocity, creating thrust. The thrust created by a jet engine is what allows most jet aircraft to fly. Thus, jet engines create enormous amounts of force from both drawing air in through their intakes, and through expelling air out of the back of the engine through its exhaust.

Traditionally, drones were limited by price and technological limitations to military applications. As the drone industry has developed, the general public can now purchase a drone for recreational and/or commercial use at affordable price points. The FAA expects the number of licensed drones to increase to 30,000 by 2020. The growth in unmanned aircraft has led to safety, privacy, and security concerns. As non-limiting examples of some of the security concerns, unmanned aircraft can be outfitted for nefarious purposes, or can accidentally be flown into restricted areas.

The disclosed embodiments are directed to the above problems.

SUMMARY OF THE DISCLOSURE

A system and method are disclosed that utilizes jet engine(s) to remove unmanned aircraft from restricted airspace. Generally, the force created by a jet engine can be used to remove drones or unwanted objects from restricted airspace, preferably by pulling a drone or flying object towards a jet engine though the force created by the engine's intake, or by expelling the drone or object from the restricted area through the force created by the jet engine's exhaust.

Non-limiting definitions that will be used in describing certain embodiments include:

| | |
|---|---|
| 3D Motion and Sound Sensor | An electronic device that contains one or more cameras capable of identifying individual objects, people and motion regardless of lighting conditions as well as one or more microphones to detect audio. The cameras can utilize technologies including, but not limited to, color RGB, CMOS sensors, infrared projectors and RF-modulated light. They may also contain microprocessors and image sensors to detect and process information both sent out and received by the various cameras.<br>The electronic device calculates if there has been a change in location of the drone or flying object of interest over a period of time. As a non-limiting example, a flying object can be at time T1 located at coordinates (x1, y1, z1) in a picture frame taken by the camera. At time T2 the same flying object is captured by the picture frame taken by the camera at coordinates (x2, y2, z2). Based on this information, motion, speed and direction can be derived utilizing the elapsed time and comparing the two 3D coordinates over the elapsed time. As opposed to conventional motion sensors, which use captured motion to control a camera, the 3D Motion and Sound Sensor preferably used with the method and system, uses the camera in order to compute the motion. The size of the drone or flying object of interest can also be computed and/or configures through software within the Senor and/or through software running, operating and/or controlling the computerized monitoring system.<br>The camera/sensors are preferably continuously on at all times while the monitoring is occurring, regardless of whether the drone or flying object of interest is moving or not, so as to ensure that any movement will be automatically captured, computer and/or monitored as it is occurring. Thus, the camera/sensors "on" time is independent of whether the drone or flying object of interest is moving or not and does not require a triggering event to turn "on". The camera preferably views the entire airspace or a large portion of the airspace simply by its placement in a manner sufficient for the airspace to be visible to the camera. Though not limiting, the defined airspace can be related to a security area, flight path, restricted air space, or any other designated or assigned area.<br>While "on", the camera can record and/or transmit video and/or 3D depth data to the other components of the system for analysis, processing and further actions. As the video camera is recording or otherwise transmitting video and/or 3D depth data to the other system components at all times during monitoring, the electronic device is able to immediately track, capture and/or record the monitored drone or flying object of interest at all times within the monitored area/airspace and will be able to provide information regarding the activities of the drone/flying object of interest while within the monitored area/airspace.<br>Preferably the 3D Motion and Sound Sensor records, captures and/or streams video and/or 3D depth data. As video is technically made up of individual picture frames (i.e. 30 frames per second of video), the |

| | |
|---|---|
| | above reference to picture frames is referring to frames of video in a preferred embodiment.<br>The 3D Motion and Sound Sensor can be located within the area of the airspace or restricted airspace being monitored and/or potentially just outside of the airspace or restricted airspace while preferably allowing the restricted airspace to still be properly monitored. The 3D Motion and Sound Sensor can be connected to the computerized communication and computerized monitoring systems via a data connection (TCP/IP or comparable technology). The described system and method can use more than one 3D Motion and Sound Sensors and is not considered limited to any specific number of sensors. |
| Computerized Monitoring System | A computer system specially programmed and/or configured to monitor activity of the 3D Motion and Sound sensor(s). The computerized monitoring system can be located at any physical location so long as a data connection (TCP/IP or comparable technology) exists between the computerized monitoring system, the computerized communication system, centralized monitoring station and the 3D motion and sound sensor(s). The computerized monitoring system preferably makes its determinations based on the data received by the video camera sensor(s)/3D Motion and Sound Sensor(s). |
| Computerized Communication System | A computer system specially programmed to facilitate communication between an administrator and computerized monitoring system in the event a drone or other unauthorized flying object enters a restricted airspace or is determined to about to enter a restricted airspace. This system may include, but is not limited to, amplified speakers, microphones, lights, monitors, audio and/or visual alarms, computer terminals, mobile phones and/or other technologies to allow for the electronic communication and/or notification to take place. The computerized communication system can also be located at any location so long as a data connection (TCP/IP or comparable technology) exists between the computerized monitoring system, the computerized communication system, centralized monitoring station and the 3D motion and sound sensor(s). |
| Centralized Monitoring Station | A computer system specially programmed and/or configured to receive video, audio and data streams from one or more computerized monitoring systems, computerized communication systems and/or 3D motion and sound sensors. The centralized monitoring station will process the information received from one or more computerized monitoring systems, computerized communication systems and/or 3D motion and sound sensors and can display the information in an organized manner to an individual or group of individuals assigned to monitor the airspace. The centralized monitoring station can be located at any location so long as a data connection (TCP/IP or comparable technology) exists between the computerized monitoring systems, computerized communication systems, centralized monitoring station and the 3D motion and sound sensors. |
| Centralized Monitoring Primary Display | A computer display connected to the centralized monitoring station, showing/displaying video and/or transmitting audio of all restricted airspace assigned for monitoring by the centralized monitoring station. Not all airspace need to be displayed at all times. Various configurations can be programmed into the centralized monitoring station. As non-limiting examples, the display can be change after a certain time period, in a rotating pattern, so that just one airspace is displayed at a time. Where a particular issue/event in a specific airspace is determined, the centralized monitoring station can cause that particular airspace to be displayed and remain displayed until the issue/event has been addressed (especially in an embodiment of the disclosure where no separate alert display is provided). Other configurations may also be used and all are considered within the scope of the disclosure. |
| Centralized Monitoring Alert Display | A computer display connected to the centralized monitoring station, showing video and audio of any restricted airspace where a drone or other unauthorized flying object has entered or about to enter the restricted airspace or other triggering event, preferably at the moment such determination is made. |
| System Database | A computer database that electronically stores records of all alerts generated, confirmation requests, responses, and reconfirmation requests. |
| Restricted Airspace | An area of airspace in which those with authority over that airspace have determined that air traffic must be restricted from access by unauthorized drones or other flying objects or from other triggering events. |
| Jet Engine | An engine, generally a gas turbine, that produces thrust from a jet of hot gases produced by burning fuel in a combustion chamber. Jet engine in this context includes gas turbine engines, turbojets, turbofans, rockets, ramjets, pulse jets, or other similar means of propulsion now developed or developed in the future. |
| Drone | An aircraft or other flying object without a human pilot aboard. This may be remotely piloted or fly autonomously without a human controller. |

| | |
|---|---|
| Access Terminal | The physical terminal where the computerized communication system can be accessed. As a non-limiting example this may include a monitor, keyboard, mouse, and/or other peripherals used to manipulate or enter data into a computerized system |
| Wireless Receiver | The device which detects signals or transmissions (or the absence of signals) from a Wireless Transmitter. This device can measure the strength of a signal in order to determine the proximity of a wireless transmitter. The wireless receiver can be in electrical communication with the computerized monitoring system or control system. |
| Wireless Transmitter | A device which transmits a code or signal unique to an authorized aircraft. The method of transmission can include, but is not limited to, Bluetooth and other long or short-range frequencies transmission techniques now known or later developed. |
| Flying Object | Any object capable of self-propelled flight or object launched from the ground on an upward trajectory. |
| Administrator | The individual or individuals who monitor or oversee the drone removal system, and/or the individual or individuals who authorize access to restricted airspace. |
| Authentication Signal | The code or signal broadcasted by the wireless transmitter unique to an authorized aircraft. |

DETAILED DESCRIPTION

Figure 1:
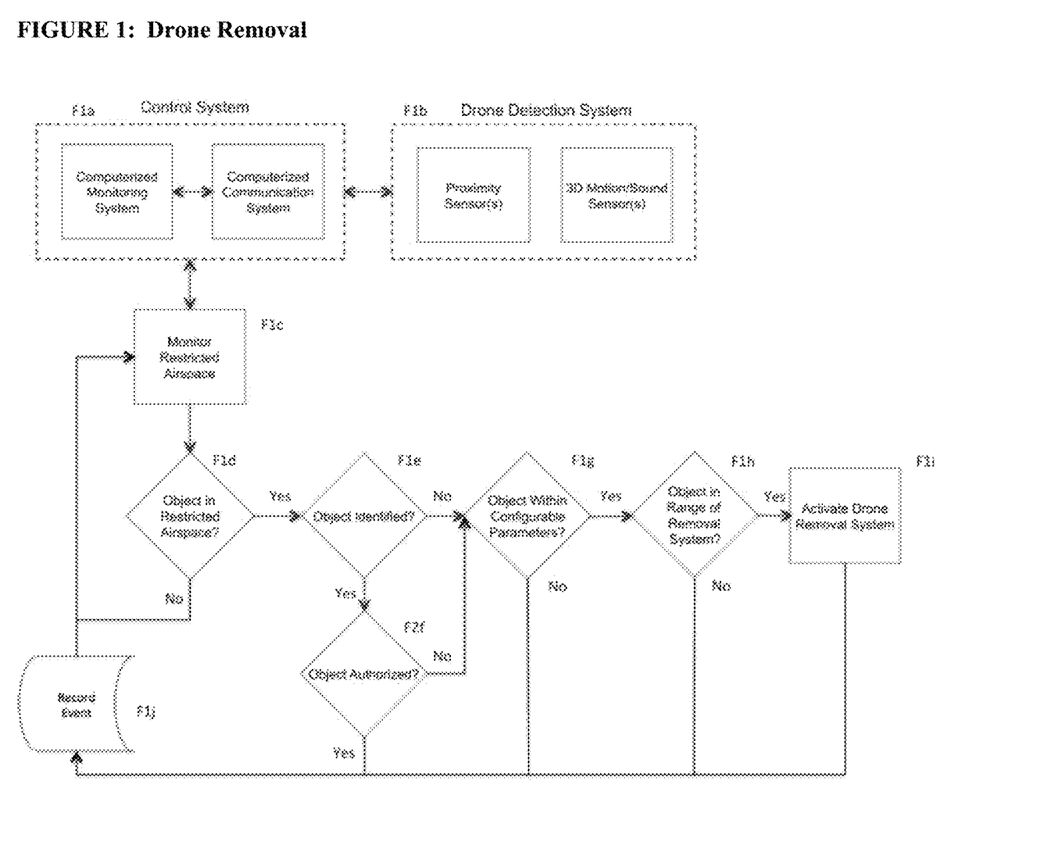
FIG. 1 is a block diagram/flow diagram of a preferred non-limiting embodiment for the drone or other flying object removal system in accordance with the present disclosure.

FIG. 1 shows the workflow for removing a drone from a restricted airspace through the use of a jet engine in conjunction with 3D Motion and Sound sensors, and/or proximity sensors in accordance with one non-limiting embodiment of the present disclosure.

At F1a, a drone removal control system preferably comprises a computerized monitoring and communication system in communication with each other. The system can include a computer and its associated peripherals through which a user has read/write access to a drone removal control system. The computerized monitoring system allows a user to view data received from a drone detection system, input system parameters, and manually control the drone removal system. In a preferred embodiment, the drone removal control system receives the raw data from the proximity sensor(s) and/or 3D Motion and Sound sensor(s). The drone removal control system determines whether a drone or other flying object has entered into restricted airspace by, in one non-limiting embodiment, creating a configurable three-dimensional zone or perimeter around a restricted area. The 3D Motion and Sound sensor(s) can be programmed to lock on the object entering the restricted area and send back to the control system the 3D coordinates of the object and a digitalized outline of the object. The control system preferably uses information received from the 3D Motion and Sound sensor(s) to determine if the object is a drone, naturally occurring object (for non-limiting example, a bird), or other object.

This captured video can also be stored and/or reviewed by the Drone Removal Control System when the system makes its determination. Adding or focusing one or more additional 3D Motion and Sound sensors and/or proximity sensors outside of the restricted area also allows the system to recognize whether an object is approaching the restricted area and allow more time for the Control System to monitor the object.

When the control system detects that an object has entered a restricted area, a record can be made and stored in the database and the audible and/or visible alerts can be issued.

At F1b, a Drone Detection System preferably comprises one or more 3D Motion and Sound sensor(s) and/or proximity sensor(s), which can be preferably connected to the Control System via a data connection (wireless, wired, TCP/IP or comparable technology). The one or more 3D Motion and Sound sensors, and/or proximity sensors can be configured to monitor an area for the presence of flying objects. The one or more 3D Motion and Sound sensors and/or proximity sensors can be configured to recognize and identify flying objects using identifiers such as size, airspeed, vehicle identification, distance between points on the object, shape of the object, etc. Alternatively, the object can be identified by means of creating a three-dimensional zone in the restricted area though the software application or though the use of an electronic transmitter attached to an authorized aircraft. Once an object is identified by the control system (or the sensors can be programmed with identifying capabilities) from the data received from the sensor(s), the software of the control system can automatically determine whether the object is authorized in the area or not, and if the object is not authorized, activate the drone removal system.

At F1c, data from the one or more 3D Motion and Sound sensor(s), proximity sensor(s), and video camera(s) can be sent to the control system. The drone removal control system monitors whether any objects have entered into the restricted airspace and if so can also determine if the object is authorized or unauthorized to be in the restricted airspace.

At F1d, the software determines whether a flying object, which can use the same methods discussed in F1b, has approached or entered the three-dimensional restricted area. Data from the one or more "continuously on" 3D Motion and Sound sensors are sent to the control system. The control system receives the raw data from the camera sensor and makes its determination based on such received raw data. The system determines whether an object has entered a restricted area preferably by creating a configurable three-dimensional zone or perimeter around the area to be restricted. The 3D Motion and Sound sensor can be programmed to lock on an object approaching and/or entering the restricted area and can send back to the computerized monitoring system the 3D coordinates of object and video telemetry of the object. If there are no objects in the restricted area, the control system continues to monitor the restricted airspace and the sensors remain continuously "on".

At F1e, the control system uses the information received from the 3D Motion and Sound Sensor to identify objects entering and/or approaching the restricted area. The software can be programmed to recognize natural objects (as non-limiting examples: birds, leaves, squirrels, etc.) compared to man-made objects such as drones. Video of the object can be captured and stored and/or reviewed by the Control System when the system makes its determination. Adding or focusing one or more additional 3D Motion and Sound Sensors and/or proximity sensor(s) outside of the restricted area allows the system to recognize that an object is approaching the restricted area to permit more time for the System to monitor the object.

At F1f, if the object can be identified by its visual, auditory, speed, or other characteristics, the system queries whether the object is authorized to be in the restricted area. If the object is permitted to be in the authorized area, the process can proceed to F1j.

At F1g, the control system can be configured to determine what parameters an object must possess in order for the drone removal system to be activated or employed. These parameters can be manually or automatically set by the control system or programmed into the control system. As a non-limiting, example, objects above or below a certain size parameter or objects moving at a certain rate of speed could be excluded from the system. If the object is not within the configurable parameters, the process can proceed to F1j.

At F1h, the control system then determines whether the object is in range of the removal system. The software running on one or more of the components of the control system can calculate the effective range of the removal system with the location and trajectory of the object. If the object is not in range, or is not on course to enter the effective range of the removal system, the process can proceed to F1j.

At F1i, in some non-limiting embodiments, the drone removal system can comprise one or more jet engine(s) and a noise abatement system. In some non-limiting embodiments, the jet engine(s) can be affixed in place, while in others the jet engine(s) can be provided on a guided track or similar mount where it can be maneuvered into position to remove a determined unauthorized drone or other object (preferably based on the estimated/calculated/anticipated trajectory or flight path of the flying object. In some non-limiting embodiments, the jet engine(s) can be designed to pull in an object out of the air through force created by its intake, while in other non-limiting embodiments, the jet engine(s) can be used to blow an object out of or prevent entry into the restricted area through the force created by the jet engine(s) exhaust.

When the drone removal system is activated or otherwise employed, the system can automatically determines the level of force necessary to expel the object from the restricted area or can automatically activate to preprogrammed level of force. In some non-limiting drone removal embodiments, this expulsion can be accomplished through the activation/use of one or more jet engines designed to pull the object into a capture device through the force created by air pulled into a jet engine's intake. In other non-limiting drone removal embodiments, this can be accomplished through activation/use of one or more jet engines designed to push away objects through the force created by expelled air through the exhaust(s) of jet engine(s). In further non-limiting drone removal embodiments, jet engine(s) can be maneuvered into place prior to activation/use, and in other non-limiting embodiments jet engine(s) may be permanently or semi-permanently mounted in place. The drone removal system can preferably adjust the amount of thrust created by the jet engines to respond to or based on the characteristics of the object to be removed. Combination of jet engines, such as some using the jet engine's intake and others using the jet engine's exhaust can also be provided and is also considered within the scope of the disclosure.

At F1j, data from the proximity and/or 3D Sound and Motion sensors, as well as any determinations, calculations, etc. performed by the control system can be stored in the system database by the control system. The system database can also be updated to reflect actions taken or not taken and any other decisions automatically made or manually entered into the control system during the process. The system can also be provided with the ability to provide audible and/or visible warnings advising or alerting designated personal, the object itself (where it has communication/intelligence capabilities) or the owner of the object (where determined) that the object is entering the restricted area. Notification can also be given that the object has failed to comply with the communication from the control system. Notification can be broadcast through phone call, text messaging, speakerphone systems, email, audible alerts, sirens, flashing lights, or other electronic means of communication.

Figure 2:
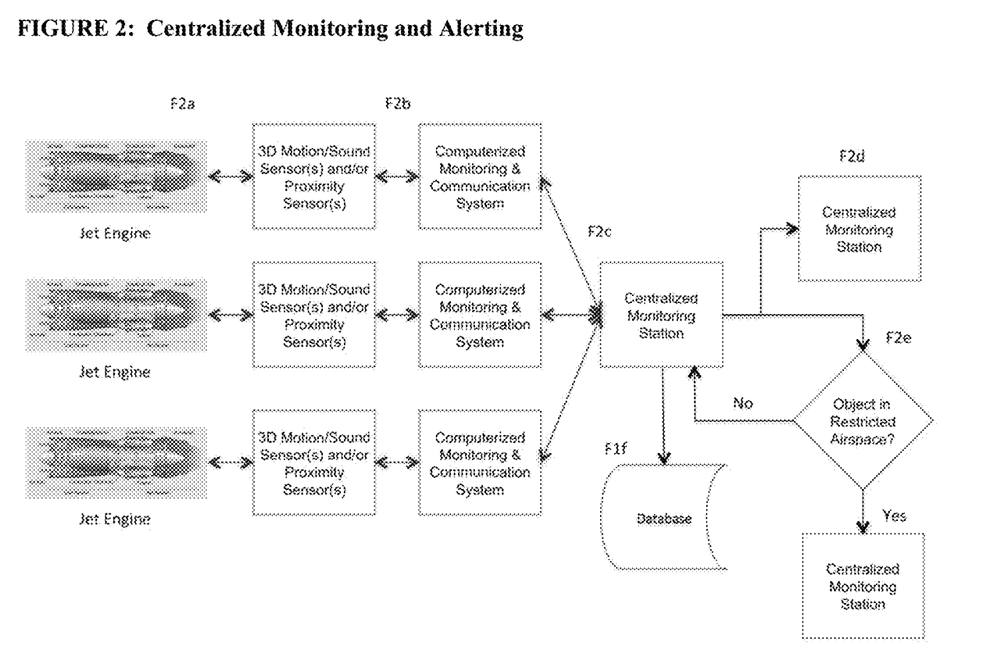
FIG. 2 is a block diagram/flow diagram of a non-limiting centralized monitoring and alerting embodiment for the drone or other flying object removal system in accordance with the present disclosure.

FIG. 2 shows the workflow for monitoring and alerting by the central monitoring & communication system regarding whether an unauthorized flying object has entered into restricted airspace through the use of 3D Motion and Sound sensors.

At F2a, one or more jet engines can be installed and are preferably located in and/or just outside the restricted airspace, though such is not considered limiting and other locations can be also be selected and considered within the scope of the disclosure. These jet engines may be permanently or semi-permanently mounted in place, or may be mounted on a moveable track or other device capable of maneuvering the jet engine into position. 3D Motion and Sound sensors and/or proximity sensors can be installed or focused in and/or just outside the restricted airspace and connected to the computerized monitoring and communication systems as described in FIG. 1. Depending on the range of the sensor(s) they can also be disposed at other locations that are also considered within the scope of the disclosure.

At F2b, the video, audio and alert data can be sent to a centralized monitoring station where the data can be aggregated. In a preferred embodiment, the computerized monitoring system can receive the raw data from the sensors, runs all of the object recognition and identification and then sends the audio, video and alert data to the centralized monitoring station.

At F2c, all video, audio and alert feeds sent by the Computerized Monitoring & Communication Systems can be preferably electronically sent to the Centralized Monitoring Station. The centralized monitoring station receives, processes and/or displays this data from the one more sensors/computerized monitoring systems. Similar to a grid of cameras being watched on a screen (i.e. where a plurality of camera feeds are viewed on a single screen), the centralized monitoring station can aggregate the various video feeds, as it receives and displays information from multiple cameras. Preferably, the centralized monitoring station receives data at all times from the sensors to allow the restricted airspace to be monitored whether or not a flying object has been detected within the restricted airspace.

At F2d, all video, audio and alert feeds received by the centralized monitoring station can be displayed on the centralized monitoring primary display. Alternatively, multiple centralized monitoring primary displays can be utilized based on the quantity of rooms/airspace to be monitored at a given time.

At F2e, when the centralized monitoring system receives an alert from any of the computerized monitoring and communication systems indicating that an unauthorized flying object has entered the restricted airspace, the video, audio and alert information can be displayed on the Centralized Monitoring Alert Display.

Should the centralized monitoring station receive alerts from more then one of the computerized monitoring and communication systems indicating that an unauthorized flying object(s) has(have) entered the restricted airspace, the centralized monitoring alert display can display the video, audio and alerting information from all such instances at the same time (i.e. split screen, etc.). The drone removal system can also be activated as described in FIG. 1. If no alert is received by the centralized monitoring station, nothing is preferably displayed on the Centralized Monitoring Alert Display. Preferably, a 360 degree panorama of the restricted airspace can be displayed and visible on the central monitoring primary display whether alerting or not. When an alert is generated, attention can be drawn to the particular camera and a duplicative display of the alerting camera can be displayed on a second separate computer monitor (i.e. centralized monitoring alert display).

At F2f, an electronic record of any alerts received by the Centralized Monitoring Station can be stored in an electronic database.

Figure 3:
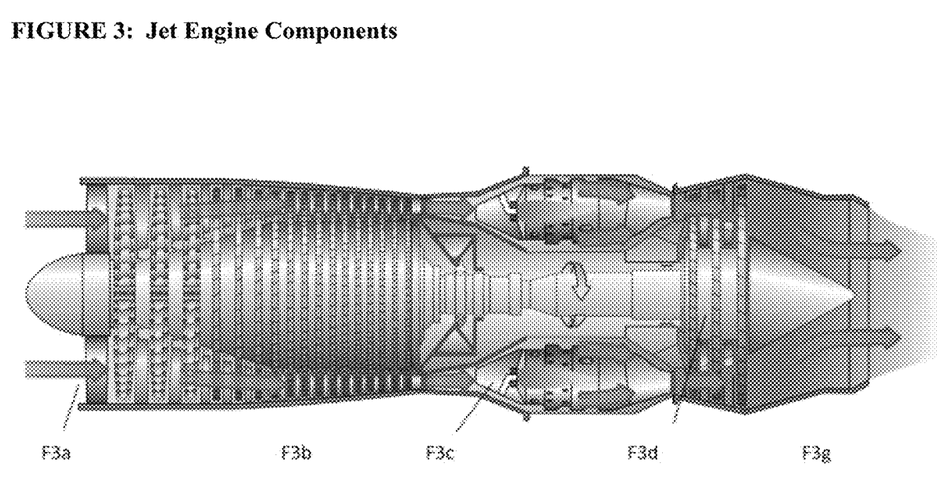
FIG. 3 is an internal view of certain components of a representative non-limiting example for a jet engine that can be used as part of the drone or other flying object removal system in accordance with the present disclosure.

FIG. 3 shows how the jet engine component in certain non-limiting embodiments creates force to pull in or push objects away from the restricted airspace. This is illustrative of how some jet engines work, and is meant as a non-limiting example of how some embodiments use jet engines to create force to pull drones or other unwanted objects towards the engine's intake, or use thrust to create force to push drones or other unwanted flying objects out of the restricted airspace. Though a jet engine is the preferred device for certain embodiments for creating the necessary suction/pull in and/or thrust/push away, it is within the scope of the disclosure that other known or later developed devices that can provide the necessary amount or a greater amount for the suction/pull in and/or thrust/push away can also be used and are considered within the scope of the disclosure.

At F3a, air can be drawn into the engine through one or more air inlets. This airflow is created by the force of spinning blades which creates suction into one or more compression chambers (See F3b). In some embodiments, this suction can be used to pull in drones or other unauthorized flying objects away from restricted airspace, and into a capture device affixed to or nearby the jet engine.

At F3b, air is drawn into the compression chamber(s) where it is compressed, converting it into a high pressure gas. The air then proceeds to the combustion chamber(s) (See F3c).

At F3c, in the combustion chamber(s), fuel is injected and the gas is ignited. The gas then becomes high temperature and pressure. This gas is then forced through a turbine (See F3d)

At F3d, the turbine can consist of a series of blades which spin rapidly, extracting energy from the compressed gas. This lowers the temperature and pressure of the gas, and creates thrust when gas is expelled out of the nozzle (See F3e).

At F3e, gas can be expelled out the rear of the engine through the nozzle. In some non-limiting embodiments, this expulsion of gas is used to blow unwanted aircraft or objects out of the restricted airspace.

Figure 4:
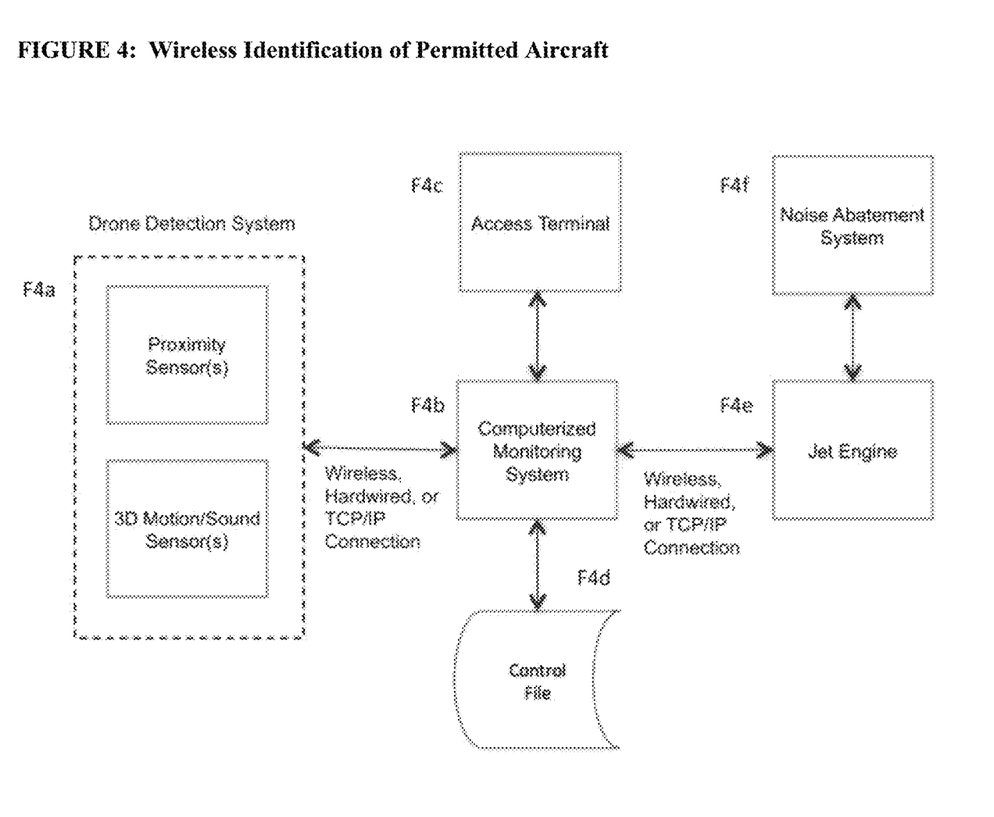
FIG. 4 is a block diagram/flow diagram of a non-limiting wireless identification of permitted aircraft embodiment for the drone or other flying object removal system in accordance with the present disclosure.

FIG. 4 shows one non-limiting embodiment in which a wireless receiver and transmitter cab be used in concert by the computerized monitoring system to identify authorized aircraft.

At F4a, the Drone Detection System can comprise one or more 3D Motion and Sound sensor(s) and/or proximity sensor(s), which can be connected to and/or in communication with the Control System via a data connection (wireless, wired, TCP/IP or comparable technology). The one or more 3D Motion and Sound sensors, and/or proximity sensors can be configured to monitor an area for the presence of flying objects and/or to continuously capture video of an area to be monitored for the presence of flying objects. The one or more 3D Motion and Sound sensors and/or proximity sensors can be configured to recognize and identify flying objects using identifiers such as size, airspeed, vehicle identification, distance between points on the object, etc. Alternatively, the object can be identified by means of creating a three-dimensional zone in the restricted area though the software application or though the use of an electronic transmitter attached to an authorized aircraft. Once an object is identified, the software can automatically determine whether the flying object is authorized in the area or not. The above steps of identifying, determining, monitoring, etc. can be also be performed by the computerized monitoring system with the sensors sending or providing a raw video feed of the area to the computerized monitoring system.

At F4b, the computerized monitoring system can also be programmed to receive a proper authorization signal for an authorized aircraft flying in or approaching the restricted airspace, preferably from a wireless transmitter that can be affixed to the authorized aircraft. The wireless transmitter preferably continuously sends out an authentication signal unique to the authorized aircraft for receipt by a wireless receiver. The wireless receiver can be preferably in wired or wireless communication with the computerized monitoring system or control system. The signal from the transmitter can be broadcasted or transmitted by long or short-range frequency transmission technology or by other preferably wireless transmission technology now known or later developed. In a preferred non-limiting embodiment, the wireless receiver which receives the signal transmitted by the wireless transmitter can be in communication with the computerized monitoring system. In addition or as an alternative to authorizing by receipt of an authentication signal, predetermined frequency or code, the computerized monitoring system can be informed that a specific aircraft has or will enter into the restricted airspace and/or from the signal transmitted from the wireless transmitter (as well as the information received from the 3D Motion and Sound Sensor(s)) and can also make an "on the spot" determination of whether the flying object is authorized by the information it receives from the transmitter and/or sensor(s). Accordingly, it is within the scope of the disclosure to use the wireless signal from the transmitter for identifying a specific aircraft. However, as described below, the signal can also be used to track the aircraft's movements within and/or outside the restricted airspace, and also track how long the aircraft remains within the restricted airspace and/or within the vicinity of the restricted airspace.

At F4c, the access terminal can be a physical computer or electronic device where an administrator can input a list of authorized aircraft, as well as enter other commands, information, instructions, authorizations, etc. as needed. This authorization may include security measures such as, but not limited to, a code(s), frequency(s), or transponder(s) carried by the authorized aircraft(s), or any other aircraft identification system now developed or developed in the future.

At F4d, the computerized monitoring system compares the any signal received by an aircraft or flying object to those in an electronic file (i.e. control file or database) where such signals or codes are stored and maintained. If the aircraft lacks a valid code or signal, it can be automatically deemed or considered to be an unauthorized flying object by the computerized monitoring system or an authorized individual can manually enter information into the system to make such a determination.

At F4e, the jet engine(s) is/are connected to the computerized monitoring system for activation as described in FIG. 1 where an unauthorized flying object has been determined to be present in or approaching the restricted airspace.

At F4f, in some non-limiting embodiments, the jet engine may include a noise abatement system. These systems include, but are not limited to, suppressed sound by inducing a rapid or shorter mixing region in the combustion chamber, including deep corrugations, lobes, or multi-lobes in the jet engine's nozzle, utilizing specifically designed noise reduction linings, or other noise reduction systems now developed or developed in the future.

The computerized monitoring system can also be programmed to send signals for controlling or adjusting the orientation or position of the at least one jet engine assembly based on a current location of the unauthorized flying object or an anticipated flight path of the unauthorized flying object. An adjustment/positioner mechanism (electrical, computerized and/or mechanical device) can be associated with the jet engine assemblies to receive the commands from the computerized monitoring system and make the necessary position/orientation adjustments for aiming the jet engine assemblies towards the unauthorized flying object or anticipated flight path of the unauthorized flying object.

Though responding to airborne object, the jet engine(s) are preferably located on land or on top of buildings or other structures.

It is also within the scope of the disclosure that the computerized monitoring system can be incorporated into or part of the sensor technology/components as opposed to a separate component.

The system can use several components for its function and operation, including, but not limited to, the following:
1. One or more 3D Motion and Sound Sensors. However, it also within the scope of the invention to eliminate the sound sensor and have the functions of the invention be performed with only motion sensors or cameras capturing video without sound, any combination of the various sensors including proximity sensors can also be used and also considered with the scope of the disclosure;
2. Computerized Monitoring System in electronic communication with the one or more 3D Motion and Sound Sensors or other sensors used;
3. Computerized Communication System in electronic communication with the Computerized Monitoring System;
4. Centralized Monitoring Station in electronic communication with one or more 3D Motion and Sound Sensors, the Computerized Monitoring and/or the Computerized Communication Systems;
5. Centralized Monitoring Primary Display in electronic communication with one or more Centralized Monitoring Stations; and/or
6. Centralized Monitoring Alert Display in electronic communication with one or more Centralized Monitoring Stations; and/or
7. One or more Jet engine(s) in electronic communication with one or more Centralized Monitoring Stations;

The various components can be in electrical, wired and/or wireless communication with each other.

It is also within the scope of the disclosure that the system be fully automatic and that the jet engines implemented and activated by the system to remove a detected unauthorized object without the use of any displays.

The automatic detection and removal of drones and other unauthorized flying objects though the use of jet engine(s) will provide significant security and privacy benefits to governments and individuals alike, including, but not limited to, the following public benefits:
1. Prevention of terrorist attacks carried out through the use of drones.
2. Reduction in incidences of security breaches in secured locations.
3. Increased privacy in secured areas.
4. Reduction in security costs for the detection and removal of drones and other unauthorized flying objects.
5. Increase of flight safety by preventing or reducing in air collisions by authorized aircraft with drones and other unauthorized flying object in the flight path of the authorized aircraft.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described device/system and their locations, electronic communication methods between the system components, wiring, attachment or securement mechanisms, dimensions, values, shapes, materials, authentication techniques, sensors, monitoring methods, etc. discussed above or shown in the drawings, if any, are merely by way of example and are not considered limiting and other component(s) and their locations, electronic communication methods, wiring, attachment or securement mechanisms, dimensions, values, shapes, materials, authentication techniques, sensors, monitoring methods etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the claims.

While the novel system and method have been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

What is claimed is:

1. A method for automatically responding to an unauthorized flying object approaching or which has entered a restricted airspace, said method comprising the steps of:
   a. positioning one or more 3D Motion and Sound Sensors such that the sensor(s) captures video of at least a portion of a restricted airspace;
   b. electronically forwarding digital video from the sensor(s) to a computerized monitoring system, the computerized monitoring system programmed to recognize when an unauthorized flying object is approaching or entered the restricted airspace based on the digital video received from the sensor;
   c. determining by the computerized monitoring system that an unauthorized flying object is approaching or entered the restricted airspace; and
   d. activating a jet engine by the computerized monitoring system to respond to the unauthorized flying object approaching or entering the restricted airspace.

2. The method for automatically responding of claim 1 further comprising the step of requesting an authorization code or signal from the unauthorized flying object prior to step d.

3. The method for automatically responding of claim 2 wherein step d. is performed only if a valid authorization code or signal is not received from the unauthorized flying object.

4. The method for automatically responding of claim 2 wherein step d. is performed only if a valid authorization code or signal is not received from the unauthorized flying object within a preconfigured time period.

5. The method for automatically responding of claim 1 further comprising the step of waiting for a preconfigured time period to receive an authorization code or signal from the unauthorized flying object by the computerized monitoring system before proceeding to step d.

6. The method for automatically responding of claim 1 wherein step d comprises (i) positioning the jet engine such that suction created by the activated jet engine is directed towards the unauthorized flying object and (ii) drawing the unauthorized flying object into the jet engine with the suction.

7. The method for automatically responding of claim 1 wherein step d comprises (i) positioning the jet engine such that thrust created by the activated jet engine is directed towards the unauthorized flying object and (ii) pushing the unauthorized flying object out of the restricted airspace with the thrust.

8. The method for automatically responding of claim 1 further comprising the step of displaying the video of the unauthorized flying object on a computer when the computerized monitoring system determines that an unauthorized flying object is approaching or entered the restricted airspace.

9. The method for automatically responding of claim 1 further comprising the step of storing information in a database regarding any actions taken by the computerized monitoring system in response to determining or detecting the unauthorized flying object approaching or entering the restricted airspace.

10. The method for automatically responding of claim 1 wherein the unauthorized flying object is a drone.

11. The method for automatically responding of claim 1 wherein the unauthorized flying object is an unmanned air vehicle or unmanned aircraft.

12. A system for automatically responding to an unauthorized flying object that is approaching or which has entered a restricted airspace, comprising:
   one or more sensors positioned to capture or transmit digital video of at least a portion of the restricted airspace;
   a computerized monitoring system in communication with the one or more sensors, the computerized monitoring system programmed to recognize when an unauthorized flying object is approaching or entered the restricted airspace from the digital video received from the one or more sensors; and
   at least one jet engine assembly positioned close enough to the restricted airspace such that suction created by the jet engine draws the unauthorized flying object in or thrust created by the jet engine pushes the unauthorized flying object away from the restricted airspace, the at least one jet engine assembly in communication with the computerized monitoring system.

13. The system for automatically responding of claim 12 wherein the computerized monitoring system is programmed to send an electronic command to activate the jet engine assembly when the computerized monitoring system determines that an unauthorized flying object is approaching or entered the restricted airspace.

14. The system for automatically responding of claim 12 further comprising a wireless receiver in communication with the computerized monitoring system, the wireless receiver capable of receiving wireless transmissions from the unauthorized flying object for processing by the computerized monitoring system.

15. The system for automatically responding of claim 12 wherein the computerized monitoring system is programmed to request an authorization code or authorization signal from the unauthorized flying object and programmed to wait a preconfigured period of time before sending a command to the jet engine to active the jet engine for responding to the unauthorized flying object.

16. The system for automatically responding of claim 12 wherein the at least one jet engine assembly is located on land, a building or other structure.

17. The system for automatically responding of claim 12 wherein the computerized monitoring system is programmed to send signals for controlling or adjusting the orientation or position of the at least one jet engine assembly based on a current location of the unauthorized flying object or an anticipated flight path of the unauthorized flying object.

18. The system for automatically responding of claim 14 wherein the wireless receiver is adapted for being in communication with a wireless transmitter associated with the unauthorized flying object, wherein the wireless transmitter sends the authorization code or authorization signal that is received by the wireless receiver for processing by the computerized monitoring system.

19. The system for automatically responding of claim 12 further comprising a database in communication with the computerized monitoring system; wherein information concerning events and actions taken with respect to a determined unauthorized flying object are stored within the database by the computerized monitoring system.

20. The system for automatically responding of claim 12 further comprising a noise abatement system associated with the at least one jet engine assemblies.

* * * * *